(12) United States Patent
Er

(10) Patent No.: US 12,415,731 B1
(45) Date of Patent: Sep. 16, 2025

(54) METHODS FOR PURIFYING GRAPHITE

(71) Applicant: Westwater Resources, Inc., Centennial, CO (US)

(72) Inventor: Cevat W. Er, Centennial, CO (US)

(73) Assignee: Westwater Resources, Inc., Centennial, CO (US)

(*) Notice: Subject to any disclaimer, the term of this patent is extended or adjusted under 35 U.S.C. 154(b) by 0 days.

(21) Appl. No.: 17/412,642

(22) Filed: Aug. 26, 2021

Related U.S. Application Data

(60) Provisional application No. 63/070,504, filed on Aug. 26, 2020.

(51) Int. Cl.
*C01B 32/215* (2017.01)

(52) U.S. Cl.
CPC ........ *C01B 32/215* (2017.08); *C01P 2006/80* (2013.01)

(58) Field of Classification Search
CPC .................................................. C01P 2006/80
See application file for complete search history.

(56) References Cited

U.S. PATENT DOCUMENTS

| | | | |
|---|---|---|---|
| 2,787,528 A | 4/1957 | Dorenfeld | |
| 2019/0210882 A1* | 7/2019 | Bowes | C25F 1/00 |
| 2022/0259047 A1* | 8/2022 | Frey | C01B 32/215 |

FOREIGN PATENT DOCUMENTS

| | | | | |
|---|---|---|---|---|
| CN | 102701198 A | | 10/2012 | |
| CN | 103449425 A | | 12/2013 | |
| CN | 103449425 B | | 12/2013 | |
| CN | 104591151 A | * | 5/2015 | |
| CN | 104591155 A | | 5/2015 | |
| CN | 108059157 A | | 5/2018 | |
| CN | 108751188 A | | 11/2018 | |
| CN | 110255553 A | * | 9/2019 | ........... C01B 32/215 |
| CN | 111072023 A | | 4/2020 | |
| CN | 111072023 B | | 4/2020 | |
| RU | 2141449 C1 | * | 11/1999 | |

OTHER PUBLICATIONS

Wang, Hao, et al. "Preparation of high-purity graphite from a fine microcrystalline graphite concentrate: Effect of alkali roasting pre-treatment and acid leaching process." Separation Science and Technology 51.14 (2016): 2465-2472.*
Bao, Chenguang, et al. "Purification effect of the methods used for the preparation of the ultra-high purity graphite." Diamond and Related Materials 120 (2021): 108704.*
Zaghib, Karim, et al. "Purification process of natural graphite as anode for Li-ion batteries: chemical versus thermal." Journal of power Sources 119 (2003): 8-15.*
Gao, Yang, et al. "Graphite recycling from the spent lithium-ion batteries by sulfuric acid curing-leaching combined with high-temperature calcination." ACS Sustainable Chemistry & Engineering 8.25 (2020): 9447-9455.*

(Continued)

*Primary Examiner* — Richard M Rump
(74) *Attorney, Agent, or Firm* — Finnegan, Henderson, Farabow, Garrett & Dunner, L.L.P.

(57) ABSTRACT

The invention relates to methods for purifying graphite comprising the steps of caustic roasting, acid leaching, and thermal treatment.

10 Claims, 2 Drawing Sheets

(56) References Cited

OTHER PUBLICATIONS

Wang, Hao, Qiming Feng, and Kun Liu. "The dissolution behavior and mechanism of kaolinite in alkali-acid leaching process." Applied Clay Science 132 (2016): 273-280.*

Wang, H. et al, (2018) 'A novel technique for microcrystalline graphite beneficiation based on alkali-acid leaching process', Separation Science and Technology, 53:6, 982-989.

R. Bhima Rao and Nivedita Patnaik (2004) 'Preparation of high pure graphite by alkali digestion method', Scandinavian Journal of Metallurgy; 33(5): 257-260.

Wang, H. et al., (2016) 'Preparation of high-purity graphite from a fine microcrystalline graphite concentrate: Effect of alkali roasting pre-treatment and acid leaching process', Separation Science and Technology, 51:14, 2465-2472.

Lu, X. J. et al., (2002) Preparation of high-purity and low-sulphur graphite from Woxna fine graphite concentrate by alkali roasting, Minerals Engineering 15, 755-757.

Wang, H. et al., (2017) 'Insights into Alkali-Acid Leaching of Secrite: Dissolution Behaviour and Mechanism', Minerals 7, 196.

Hien Tran Thi and Nga Do Hong (2017) "Sulfuric acid leaching process for producing high purity graphite from 92.6% C to 98% C", World Journal of Research and Review 5(1), 23-26.

Bhima Rao et al., "Preparation of high pure graphite by alkali digestion method", Scandinavian Journal of Metallurgy, 2004, 33(5), 257-260.

Wang et al., "Preparation of high-purity graphite from a fine microcrystalline graphite concentrate: Effect of alkali roasting pre-treatment and acid leaching process", Separation Science and Technology, 2016, 51(14), 2465-2472.

Lu et al., "Preparation of high-purity and low-sulphur graphite from Woxna fine graphite concentrate by alkali roasting", Minerals Engineering, 2002, 15, 755-757.

Wang et al., "A novel technique for microcrystalline graphite beneficiation based on alkali-acid leaching process", Separation Science and Technology, 2017, 53(6), 982-989.

Thi et al., "Sulphuric Acid Leaching Process for Producing High Purity graphite from 92.6% C to 98% C", world Journal of Research and Review, 2017, 5(1), 23-26.

\* cited by examiner

METHODS FOR PURIFYING GRAPHITE

RELATED APPLICATIONS

This application claims the benefit of U.S. Provisional Application No. 63/070,504, filed on Aug. 26, 2020, the entire disclosure of which is incorporated herein by reference in its entirety.

BACKGROUND OF THE INVENTION

Graphite is one of the most common forms of naturally occurring polymorphs of crystalline carbon. Graphite has a layer structure in which the atoms are arranged in a hexagonal pattern within each layer, and the layers are stacked in the ABAB or ABC sequence. Graphite has a unique structure that gives it several advantageous properties and characteristics, such as an excellent conductor of electricity and heat, high natural strength and stiffness, high-temperature resistance, excellent lubrication properties, lightweight reinforcing agent, and inertness. As a result, graphite has a wide variety of uses, including use in batteries. Graphite can be used in batteries to improve electrical conductance while remaining chemically inert and stable against corrosion. In lithium-ion (Li-ion) batteries, graphite is the main constituent of the anode, acting as a host for lithium ions. Graphite use in the battery industry is expected to increase over the next decade. In the battery market, the purity of graphite is an important property. Pure graphite is one of the most chemically inert materials. However, impurities are almost always present to some degree in both natural and synthetic graphites. These impurities have a significant catalytic effect, with the resulting increase in chemical reactivity. Therefore, battery graphite materials must be purified to the maximum extent prior to their use in batteries. Major impurities in natural flake graphite concentrates are silica, kaolinite, muscovite, Fe-clays, and Fe-hydroxides.

There are a limited number of technologies worldwide that can be used to purify natural flake graphite concentrates to battery-grade purity (≥99.95 wt % C). The technologies are: (1) thermal methods: electrothermal fluidized bed, and carbochlorination (see, e.g., Federov et. al., 2016); and (2) hydrometallurgical methods: hydrofluoric acid (HF)/hydrochloric acid (HCl) leaching (see, e.g., CN1040638C, 1998) and caustic baking, followed by acid washing (see, e.g., Wang et. al., 2016; Waugh, 1987).

Each method can effectively purify graphite. However, operational and capital costs, environmental impacts and mitigations could limit the applications of these methods to purify concentrate or spherical graphite. Thus, a need exists for new methods to efficiently achieve high-level purification of graphite concentrate.

SUMMARY OF THE INVENTION

This disclosure relates to methods of obtaining highly purified graphite from a natural flake graphite concentrate or spheroidized graphite sample comprising the steps of: (a) caustic roasting; followed by (b) two stages of caustic washing, acid leaching, caustic leaching, and acid leaching of the roasted sample; and (c) thermal treatment of the sample; thereby producing purified graphite having a graphitic carbon (Cg) grade of at least 99.9%. The methods may further comprise washing and filtration steps after caustic wash, acidic leaching, caustic leaching, and acidic leaching. The methods may further comprise a drying step prior to (c) thermal treatment.

The graphite concentrate or spheroidized graphite can be mixed with caustic solution during caustic roasting. For example, the graphite concentrate or spheroidized graphite can be mixed with about 25% to about 50% by weight caustic solution during caustic roasting (e.g., about 25-30%, about 30-35%, about 35-40%, about 40-45%, about 45-50%, about 25%, about 30%, about 35%, about 40%, about 45%, or about 50% caustic solution). The caustic solution can be a solution of sodium hydroxide (NaOH).

The temperature during caustic roasting can range from about 350 to about 700 degrees centigrade (e.g., about 350-525° C., about 525-700° C., about 350-450° C., about 400-500° C., about 450-550° C., about 500-600° C., about 550-650° C., about 600-700° C., about 350-400° C., about 400-450° C., about 450-500° C., about 500-550° C., about 550-600° C., about 600-650° C., or about 650-700° C.). The caustic roasting can be carried out in any suitable heating device. For example, caustic roasting can be done in a furnace, such as a rotary kiln furnace. The caustic roasting step can be carried out over a suitable period of time. For example, the caustic roasting step can range from 20 minutes to one hour (e.g., about 20 minutes, about 25 minutes, about 30 minutes, about 35 minutes, about 40 minutes, about 45 minutes, about 50 minutes, about 55 minutes, or about 60 minutes).

The acid leaching step can be performed with any suitable acid. The suitable acid may be sulfuric acid or hydrochloric acid. The acid leaching step can be performed with sulfuric acid. The acid leaching step can be carried out for any suitable period of time, and at any suitable temperature. For example, the sample can be leached for about one to two hours at a temperature of about 50 degrees to about 95 degrees centigrade (e.g., for about 60-90 minutes, about 90-120 minutes, about 60-70 minutes, about 65-75 minutes, about 70-80 minutes, about 75-85 minutes, about 80-90 minutes, about 85-95 minutes, about 90-100 minutes, about 95-105 minutes, about 100-110 minutes, about 105-115 minutes, or about 110-120 minutes; and at a temperature of about 50-65° C., about 65-80° C., about 80-95° C., about 50-55° C., about 55-60° C., about 60-65° C., about 65-70° C., about 70-75° C., about 75-80° C., about 80-85° C., about 85-90° C., or about 90-95° C.).

The first and second washing steps can be performed using any suitable wash solution, such as water or deionized water.

The thermal treatment step may comprise heating the graphite concentrate or spheroidized graphite in an inert atmosphere to a temperature sufficient to remove residual impurities. For example, the thermal treatment step may comprise heating the graphite concentrate or spheroidized graphite to a temperature between about 1800 to about 2200 degrees centigrade in an inert atmosphere to remove residual impurities (e.g., a temperature of about 1800-1900° C., about 1900-2000° C., about 2000-2100° C., or about 2100-2200° C.). The inert atmosphere can be a nitrogen atmosphere. The thermal treatment step can be performed in any suitable heating device. For example, the thermal treatment step can be performed in a furnace, such as a furnace selected from the group consisting of a pusher furnace, a vertical furnace, a rotating tube furnace, a vacuum furnace, and a fluidized bed electrothermal furnace. The sample can be agitated during heating. The sample can maintain a temperature of about 1800 to about 2200 degrees centigrade for about 10 minutes to about 30 minutes. The graphite concentrate sample or spheroidized graphite can be purified to greater than 99.95% Cg.

DETAILED DESCRIPTION

Figure 1A:
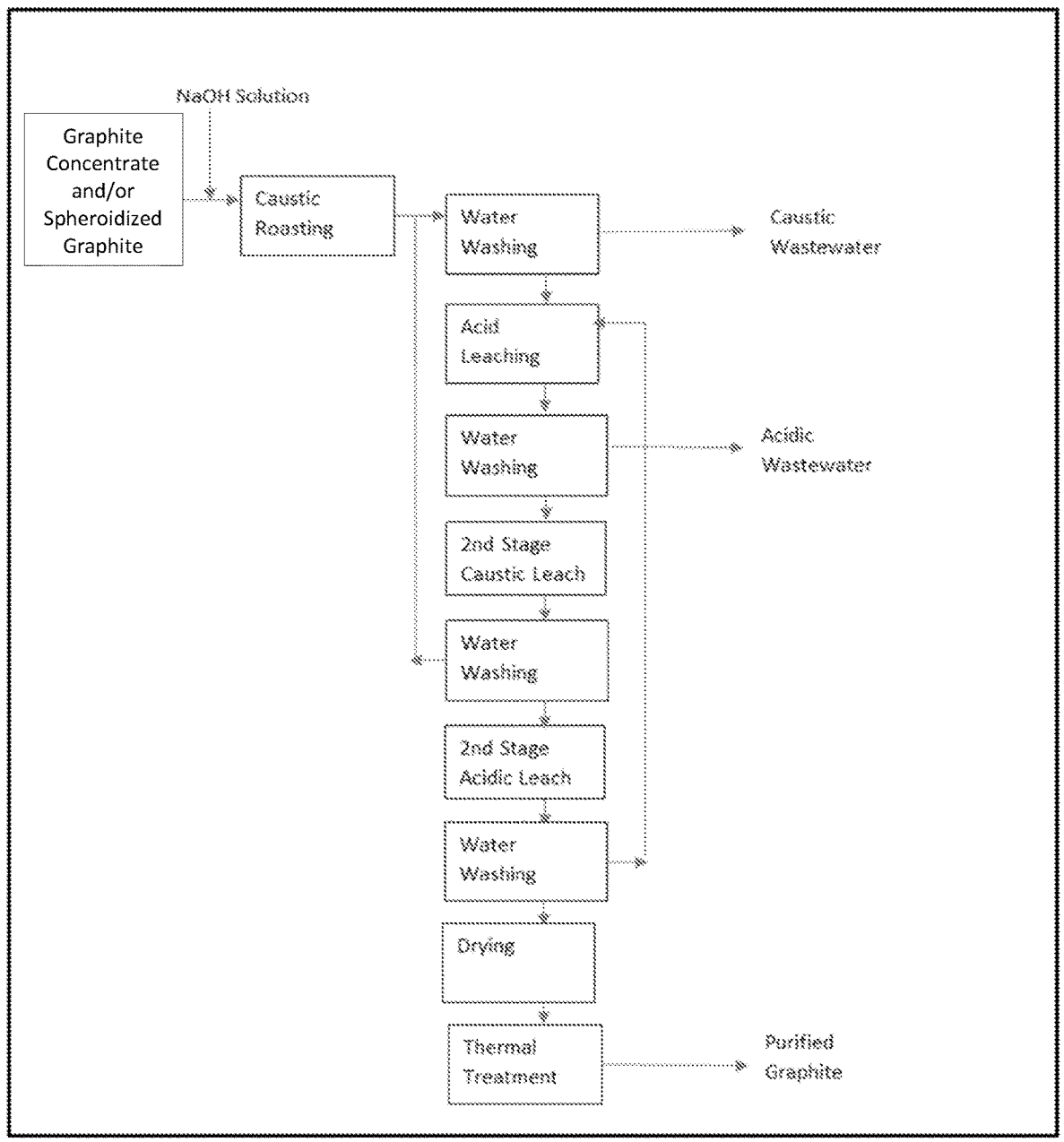
FIGS. 1A and 1B are schematics illustrating the process of purifying graphite, e.g., from graphite concentrate and/or spheroidized graphite.
Figure 1B:
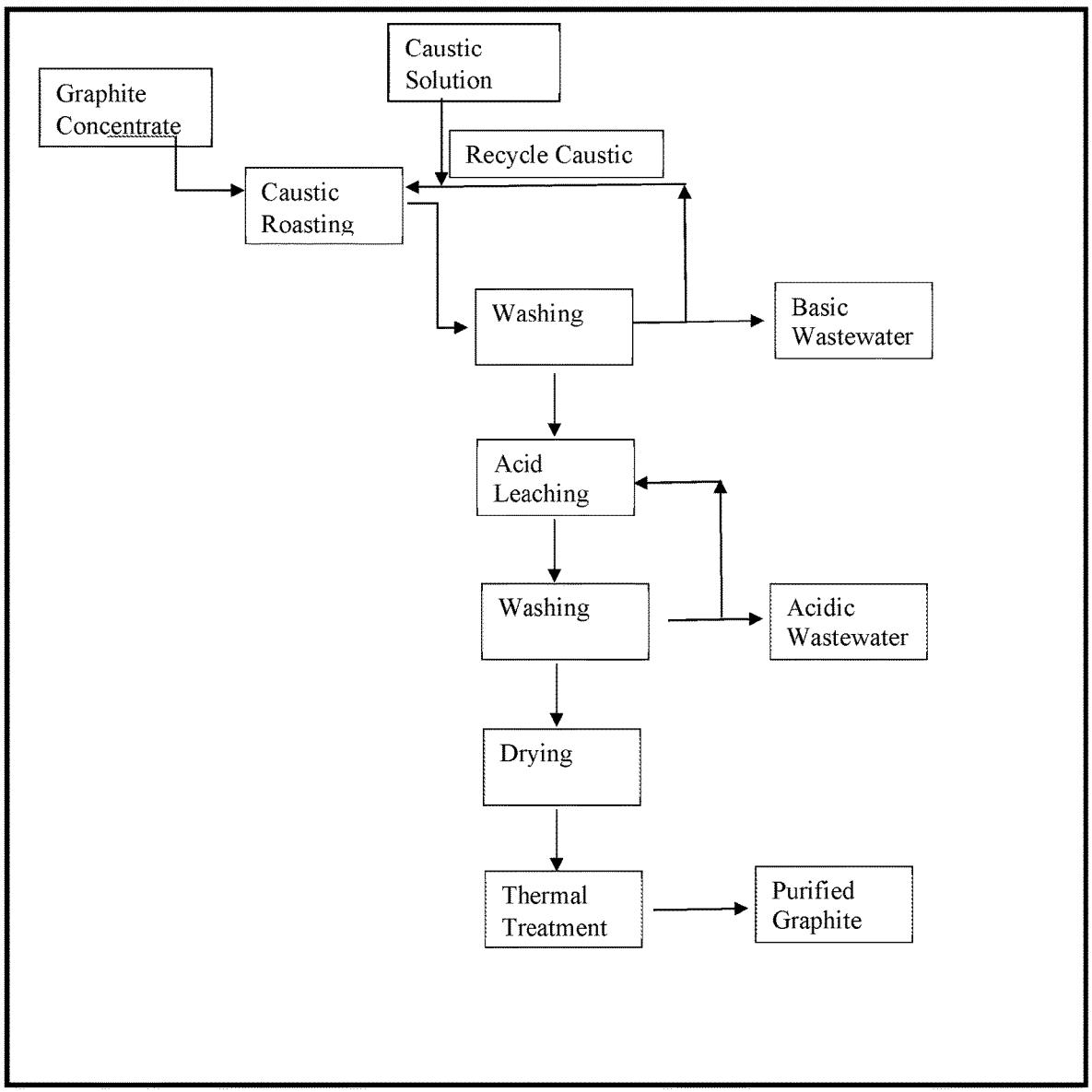

The present disclosure provides methods to remove undesirable impurities in natural flake graphite concentrates or in spheroidized graphite obtained from natural graphite concentrates, thereby raising the graphite carbon grade from 95-97% graphitic carbon (Cg) to at least 99.9% Cg, preferably 99.95% Cg, 99.96% Cg, 99.97% Cg, 99.98% Cg, or 99.99% Cg, or greater. The purification methods described herein facilitate the preparation of battery ready advanced graphite products.

Although methods for the purification of graphite and some coals involving rigorous processing conditions have been used widely for a number of years, the method disclosed herein provides methods which require less stringent chemical leaching in conjunction with thermal purification at relatively lower temperatures and residence times, which surprisingly can be used to achieve high-level purification of graphite concentrate or spheroidized graphite.

The method disclosed herein utilizes caustic roasting and acid leaching technology, combined with thermal treatment to purify the graphite from undesirable impurities. The methods provided herein can purify natural flake graphite concentrate or spheroidized graphite from 95-97% Cg to at least 99.95% Cg and greater (e.g., 99.96%, 99.97%, 99.98%, or 99.99% Cg, or greater).

In one aspect, the method disclosed herein comprises a chemical purification process including one-stage caustic roasting, washing, acid leaching, washing, and drying steps; or two-stage caustic roasting, washing, acid leaching, washing, caustic leaching, washing, acid leaching, washing, and drying steps. The chemical purification process may then be followed by thermal treatment to remove most (or substantially all) of the residual impurities from graphite.

In one embodiment, mixtures of caustic solution and natural graphite concentrate powder or spheroidized graphite are roasted in a furnace. The caustic solution may be a sodium hydroxide (NaOH) solution. The roasted materials can then be washed until they are at approximately neutral pH (e.g., pH from 6 to 8, pH 6, pH 7, pH 8), and/or to remove both the soluble roasting products and the extra alkali. The washed materials can then be treated with an acidic solution to further remove insoluble compounds (such as hydroxides and oxides). The acid leached materials can then be washed until they are at an approximately neutral pH (e.g., pH 6 to 8, pH 6, pH 7, pH 8) and dried. Finally, the dried graphite materials can be placed in a furnace to remove any residual impurities. Optionally, the purified samples can be packaged for further processing, such as for battery-ready specialty products.

Caustic Roasting

The majority of graphite impurities are silicate minerals such as quartz, clays (kaolinite, sericite, illite, montmorillonite, talc, etc.), micas (biotite and muscovite), and iron oxides. The main impurity compositions are $SiO_2$, $Al_2O_3$, and $Fe_2O_3$. Alkali roasting is an effective method to eliminate silicates from graphite concentrates (see, e.g., Wang et. al., 2016).

Graphite concentrates containing particles from −325 mesh (44 micrometers) to +30 mesh (595 micrometers) sizes or spheroidized graphite particles from 5 to 50 micrometers may be mixed with a caustic solution (e.g., NaOH solution). The caustic solution (e.g., NaOH solution) may be about 25 to about 50%, about 30% to about 50%, about 40 to about 50%, about 20%, about 25%, about 30%, about 35%, about 40%, about 45%, about 50%, or about 55% by weight. The amount of caustic solution (e.g., NaOH) added to the graphite concentrate or spheroidized graphite ranges from about 200 to about 300 kg per metric ton of graphite (e.g., about 200 kg, about 210 kg, about 220 kg, about 230 kg, about 240 kg, about 250 kg, about 260 kg, about 270 kg, about 280 kg, about 290 kg, or about 300 kg). The mixture can be placed in any suitable furnace (e.g., rotary kiln furnace) operating at a temperature ranging from about 350 to about 700 degrees centigrade. The temperature of the furnace may be about 350, about 375, about 400, about 425, about 450, about 475, about 500, about 525, about 550, about 575, about 600, about 625, about 650, about 675, or about 700 degrees centigrade. The sample reaction time may range from about 20 minutes to about 1 hour (e.g., about 20 minutes, about 25 minutes, about 30 minutes, about 35 minutes, about 40 minutes, about 45 minutes, about 50 minutes, about 55 minutes, or about 60 minutes). After completion of the reaction, the graphite can be washed until the wash solution pH drops to approximately neutral (e.g., pH of 6 to 8, pH=6, pH=7, pH=8). The following reactions occur in the furnace, using NaOH as an example:

$$SiO_2 + 2NaOH = Na_2SiO_3 + H_2O$$

$$Al_2O_3 + 2NaOH = 2NaAlO_2 + 4H_2O$$

$$P_2O_5 + NaOH = 2Na_3PO_4 + 3H_2O$$

$$TiO_2 + NaOH = Na_2TiO_3 + H_2O$$

$$V_2O_5 + NaOH = 2Na_3VO_4 + 3H_2O$$

Most of the reaction products are water-soluble. During the washing step, these water-soluble products can be removed from the roasted graphite.

One of the major reactions during caustic roasting is the formation of zeolites. Dissolution of clay minerals in alkaline media gives rise to $SiO_2(OH)_2{}^{2-}$ and $SiO(OH)_3{}^-$ as well as $(Al(OH)_4)$-1 monomers. These monomers can interreact to form solid zeolites (sodalite) with Si/Al<1:

$$8Na + 6(Al(OH)_4)\text{-}1 + 6SiO_3\text{-}2 + 2OH = Na_6[AlSiO_4]_6 2NaOH \cdot nH_2O + (6-n)H_2O + 12OH^{-1}$$

Washing Step

After roasting is completed, the material may be washed with a solution (e.g. water) and filtered, such as using a vacuum belt filter or pressure filter. Additionally, counter-current washing may also be used in continuous operations to wash the graphite concentrate thoroughly. The final washing step for the counter-current washing may be done with water (e.g., deionized water). The volume of wash solution (e.g. water, deionized water) used per metric ton of graphite may range from 1 to 3 tons of wash solution, for example about 1 ton, about 1.5 tons, about 2 tons, about 2.5 tons, or about 3 tons of wash solution may be used per metric ton of graphite. Thorough washing of graphite after roasting is optional, as acid leaching, washing, and thermal purification steps follow.

The wash solution effluents from washing steps are collected in a tank as alkaline wastewater, which can be directed to treatment, recovery, and recycling.

Acid Leaching Step

The acid leaching step (e.g., sulfuric acid ($H_2SO_4$) leaching), can be performed to remove impurities, such as iron compounds, metal hydroxides, zeolites, and other impurities that were not removed by the alkali roasting step. Any suitable acid may be used in the acid leaching step. In a preferred embodiment, sulfuric acid is utilized in the acid leaching step. Alternatively, hydrochloric acid (HCl) may be used. An acid solution comprising 2-10% by weight acid concentrations can be prepared from 96%-98% concentrated sulfuric acid, that may be used for the acid leaching step. The liquid-to-solid ratio in the acid leaching step may range from about 3:1 to about 10:1. The liquid-to-solid ratio may be about 3:1, about 4:1, about 5:1, about 6:1, about 7:1, about 8:1, about 9:1, or about 10:1. The amount of acid (e.g., sulfuric acid) added to the graphite concentrate or spheroidized graphite ranges from about 100 to about 250 kg per metric ton of graphite, e.g., about 125 to about 250 kg per metric ton of graphite, about 150 to about 250 kg per metric ton of graphite, about 175 to about 250 kg per metric ton of graphite, about 200 to about 250 kg per metric ton of graphite, or about 225 to about 250 kg per metric ton of graphite. In some embodiments, the amount of acid (e.g., sulfuric acid) added to the graphite concentrate or spheroidized graphite is about 100, about 110, about 120, about 130, about 140, about 150, about 160, about 170, about 180, about 190, about 200, about 210, about 220, about 230, about 240, or about 250 kg per metric ton of graphite.

The sample may be leached for about 40 minutes to about 120 minutes, e.g., about 40 minutes to about 75 minutes, about 45 minutes, about 50 minutes, about 60 minutes, about 70 minutes, about 80 minutes, about 90 minutes, or about 120 minutes. The temperature during the acid leaching step may be about 50 to about 95 degrees centigrade, e.g., about 60 to about 95 degrees centigrade, about 70 to about 95 degrees centigrade, about 50 degrees centigrade, about 60 degrees centigrade, about 70 degrees centigrade, about 80 degrees centigrade, about 90 degrees centigrade, or about 95 degrees centigrade. In one embodiment, the sample is leached for about one to two hours (e.g., about one hour, about 1.5 hours, about two hours) at a temperature of about 50 to about 95 degrees centigrade.

Typical reactions for sulfuric acid include:

$$Fe_2O_3 + 3H_2SO_4 = Fe_2(SO_4)_3 + 3H_2O$$

$$MgO + H_2SO_4 = MgSO_4 + H_2O$$

$$Na_6[AlSiO_4]_6 2NaOH + 13H_2SO_4 = 4Na_2SO_4 + 3Al_2(SO_4)_3 + 6Si(OH)_4 + H_2O$$

For improved leaching efficiency, parameters such as solid:liquid ratio, acid concentration, leaching time, temperature, and mixing rate can be optimized. After the leaching step, solid-liquid separation may be performed either on a vacuum filter or pressure filter. The solids can then be washed in the countercurrent washing process. The liquid waste is directed for recycling, recovering, and neutralization processes.

Washing

Acid leached solids may be washed with any suitable wash solution (e.g., water, deionized water) with countercurrent washing operations. The volume of wash solution (e.g., water, deionized water) used per metric ton of graphite may range from about 2 to about 5 metric tons of wash solution (e.g., 2, 2.5, 3, 3.5, 4, 4.5, or 5 metric tons). Thorough washing after acid leaching can be carried out to ensure that any residual Na, Si, SO$_4$, Al, and Fe impurities are removed. The graphite concentrate can be re-pulped and filtered or thickened at each step of the counter-current washing.

The wash solution effluents from the washing steps may be collected in a tank as acidic wastewater, and directed to treatment, recovery, and recycling.

Acid leaching and washing steps can remove the majority of the remaining impurities, which may comprise iron compounds, sodalite-type zeolites, and metal oxides. For example, the impurities may consist of iron compounds, sodalite-type zeolites, and metal oxides.

After first stage acid leaching, the second stage caustic leaching, washing, acid leaching and washing steps can be performed as necessary. In the second stage leaching, the amounts of caustic and acid can be lowered.

Drying

After the chemical purification steps (i.e., caustic baking/roasting and acid leaching), the solid graphite particles can be directed into a drying furnace operating at a temperature sufficient to remove the majority of the moisture, such as moisture held in the pores. For example, the temperature of the drying furnace may be between about 100-130 degrees° C.). Some of the volatiles present in the graphite may also be removed from the concentrates at this stage.

Thermal Treatment

The reactions above can remove the majority of the impurities present in the graphite concentrate or spheroidized graphite. The method disclosed herein is capable of obtaining high-level purification by further removing impurities from graphite that remain after chemical purification (e.g., to increase purity beyond about 99 to 99.95% Cg obtained by chemical purification methods alone). Thermal treatment (e.g., furnace treatment) is capable of removing the residual impurities. At this stage of the method disclosed herein, the majority of the impurities are Si, Al, Fe, SO$_4$, and Na (from NaOH).

The dried graphite particles may be heated to a temperature of between about 1800° C. and 2200° C., e.g., between about 1800° C. and 1900° C., between about 1900° C. and 2000° C., between about 2000° C. and 2100° C., or between about 2100° C. and 2200° C., e.g., about 1800, about 1850, about 1900, about 2000, about 2050, about 2100, about 2150, or about 2200 degrees centigrade, to remove the residual impurities. The dried graphite particles can be heated under an inert atmosphere (e.g., a nitrogen atmosphere, or an argon atmosphere) to remove the residual impurities. Various furnaces such as a pusher furnace, a vertical furnace, a rotating tube furnace, a vacuum furnace, a fluidized bed electrothermal furnace, etc. can be utilized to achieve these temperature ranges. In a preferred method, agitation is generated during heating, such that heat distribution in the sample is uniform.

The residence time of the sample in the heated zone may range from 10 to 30 minutes. For example, the residence time of the sample in the heated zone may be about 10 minutes, about 15 minutes, about 20 minutes, about 25 minutes, or about 30 minutes.

The complete method described herein (i.e., chemical purification and thermal treatment) is capable of attaining Cg graphite grades of about 99.95% to about 99.99% Cg. For example, a graphite grade of 99.95%, 99.96%, 99.97%, 99.98%, or 99.99% Cg may be attained.

In one embodiment, the dried graphite concentrate is heated to a temperature between 1800 to 2200 degrees centigrade in an inert atmosphere (e.g., nitrogen atmosphere) to remove the residual impurities, thus attaining a 99.95 to 99.99% Cg graphite grade.

What is claimed is:

1. A method of obtaining purified graphite from a natural flake graphite concentrate or spheroidized graphite, comprising the steps of:
   caustic roasting the graphite concentrate sample or spheroidized graphite to react silicon to form water soluble compounds and to provide a roasted graphite in a furnace;
   caustic leaching the roasted graphite to remove silica;
   washing and filtering the roasted graphite;
   acid leaching the roasted graphite to remove iron compounds and metal hydroxides;
   caustic leaching the roasted graphite to remove impurities;
   acid leaching the roasted graphite to remove iron compounds and metal hydroxides;
   washing and filtering the roasted graphite;
   drying the roasted graphite;
   thermally treating the roasted graphite to remove silicon, iron, sodium, and sulfur resulting in the purified graphite.

2. The method of claim 1, wherein the natural flake graphite concentrate or spheroidized graphite has a graphitic carbon (Cg) grade of at least 95%.

3. The method of claim 2, wherein the graphitic carbon (Cg) grade ranges from 95% to 97% of the natural flake graphite concentrate or spheroidized graphite.

4. The method of claim 1, wherein the purified graphite has a graphite carbon (Cg) grade of at least 99.95%.

5. The method of claim 1, wherein the graphite concentrate or spheroidized graphite is mixed with about 25% to about 50% by weight of a caustic solution during caustic roasting.

6. The method of claim 5, wherein the caustic solution is a sodium hydroxide (NaOH) solution.

7. The method of claim 1, wherein caustic roasting is at a temperature ranging from about 350 degrees centigrade to about 700 degrees centigrade.

8. The method of claim 1, wherein caustic roasting is done in a furnace.

9. The method of claim 8, wherein the furnace is a rotary kiln furnace.

10. The method of claim 1, wherein acid leaching is performed with sulfuric acid.

* * * * *